March 7, 1933.   F. A. GARRETT   1,900,052
CARDAN SHAFT
Filed July 30, 1930
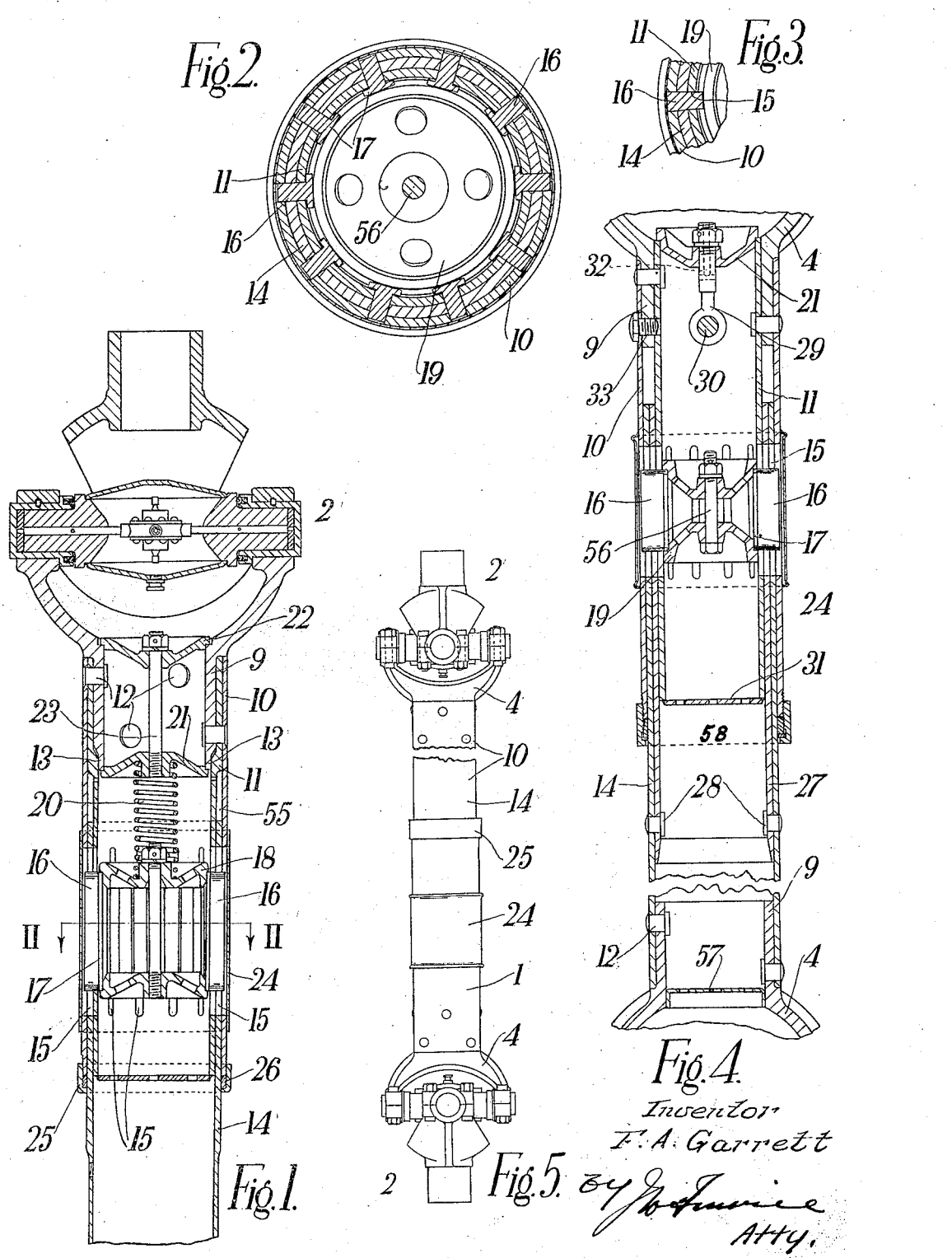
Inventor
F. A. Garrett
By Jo Irwine
Atty.

Patented Mar. 7, 1933

1,900,052

UNITED STATES PATENT OFFICE

FRANCIS ALBERT GARRETT, OF IPSWICH, ENGLAND, ASSIGNOR TO RANSOMES, SIMS & JEFFERIES, LIMITED, OF IPSWICH, ENGLAND

CARDAN SHAFT

Application filed July 30, 1930, Serial No. 471,780, and in Great Britain August 29, 1929.

The invention relates to Cardan shafts for use on electric trolley buses and other mechanically propelled vehicles or for other purposes where it is necessary to transmit power through shafts which are not in alignment and more especially where the shafts are telescopic in order to allow for up and down movements of either of the universal joints which are usually arranged at the ends of the Cardan shaft. For example, it is usual on mechanically propelled road vehicles to transmit the torque from the power unit or gear box to the road wheels by means of two universal joints between which is a short length of shaft which is arranged to telescope on a portion of shaft which is splined to the drive at this point.

The objects of the invention are to enable adequate strength and rigidity to be obtained with a light construction, to avoid the vibration which, with Cardan shafts as hitherto constructed, is frequently set up at certain speeds, and to ensure thorough lubrication of the relatively moving parts and in such a manner as to avoid dirt or water being drawn in between such parts likely to cause undue wear.

With the above objects in view, the invention consists in the novel construction and combination of parts substantially as hereinafter described and more particularly defined by the appended claims, it being understood that such changes in the precise embodiments of the herein disclosed invention may be made as come within the scope of the claims.

In the accompanying drawing wherein similar reference numerals indicate corresponding parts throughout the figures:

Figure 1 is a longitudinal section of part of one form of Cardan shaft according to the invention.

Figure 2 is a cross-sectional view on II—II, Figure 1.

Figure 3 is a fragmentary sectional view, similar to Figure 2, but showing an alternative form of driving key.

Figure 4 is a longitudinal section of part of a second form of Cardan shaft according to the invention.

Figure 5 is an outside elevation of the form of shaft illustrated in Figure 4.

Referring to Figures 1 and 2, it will be seen that the telescopic portion of shafting 1 comprises two lengths of tubing 10 and 11 which at one end are shaped as shown to fit together, so that they may be thrust onto a boss 9 of one fork 4 of a universal joint 2 secured thereto, for example, by rivets 12. The universal joint 2 may be similar to that described in my co-pending patent application, Serial No. 544,603, filed June 15, 1931. The inner tube 11 is reduced in diameter beyond the boss 9 so as to leave a space 55 between it and the outer tube 10. The boss 9 is preferably reduced in diameter at 13 to fit the adjacent part of the inner tube 11.

A third and longer tube 14 is inserted in the space 55.

The overlapping parts of the three tubular portions of shaft 10, 11 and 14 have corresponding slots 15 extending longitudinally and radially and preferably equally spaced around the periphery. Driving keys 16 are inserted in the slots 15, the keys being shorter than the slots and being a sliding fit therein.

Each key 16 is of T cross-section, as indicated in Figure 2, and is inserted in the slot so that the flange 17 of the key is inside the tube 11. The keys 16 are carried at the ends of their flanges 17 between two clamping discs 18 and 19 which are drawn together by a clamping bolt 56. The keys 16 and the discs 18 and 19 thus resemble a squirrel cage which is free to slide longitudinally relatively to the telescopic tubular shaft 1. The keys 16 form a driving connection between the overlapping portions of the tubes 10, 11 and 14, but owing to the difference in length between the keys 16 and their slots 15 relative longitudinal sliding movement between the combined portions 10 and 11 and the portion 14 of the shaft is permitted within a considerable range. The keys are preferably rounded at their ends to avoid abrasion or cutting action between the keys and the sides of the slots 15.

A spring 20 may be provided to hold the discs 18 and 19 and keys 16 in position, the spring 20 being secured at one end to the disc 18 and at the other to a disc 21 so that it acts under tension and compression to return the keys to normal position after displacement. The disc 21 and another disc 22 are clamped to the boss 9 by a bolt 23. The disc 21 closes off the end of the Cardan shaft and the other end may be similarly closed so that oil may be contained in the tube 11 to lubricate the keys 16.

A light metal sleeve 24 closes the slots 15 on the outside. The free end of the outer tube 10 is provided with a screwed gland ring 25 containing packing 26 to prevent escape of oil or ingress of dirt or water at this position.

As illustrated by Figure 3, the keys 16 may be of tapered form in cross-section, and the slots 15 be correspondingly formed to permit of the keys being inserted from the outside.

The tubular portion of shaft 14 may be reinforced by another tube 27, as indicated in Figure 4, the two tubes 14, 27 being riveted together as indicated at 28. In the form shown in this figure, no spring is provided and one closing disc 21 is secured by an eye-bolt 29, the eye of which is anchored to a pin 30 passing across the boss 9 and tubes 10 and 11. A disc 31 closes off the opposite end of the tube 11. This disc is perforated and the bolt 29 has a bleed hole 32 to ensure equalization of air pressure inside the Cardan shaft. The perforations are arranged to allow any excess of oil which may have escaped into the tubular portion 58 to drain back into the keyed portion of the shaft. It will be understood that the Cardan shaft is usually tilted so that ample oil will be retained. Oil is inserted by removal of a screwed plug 33.

A perforated disc 57 closes off the boss 9 of the fork 4 at the opposite end of the shaft 1.

I claim:

1. A Cardan shaft having a universal joint at each end and two intermediate tubular portions of shaft telescoping into one another, said tubular portions having a plurality of corresponding longitudinal slots, driving keys in said slots, and a carrier within the shaft for supporting said keys, substantially as and for the purpose hereinbefore set forth.

2. A Cardan shaft having a universal joint at each end and two intermediate tubular portions of shaft telescoping into one another, said tubular portions having a plurality of corresponding longitudinal slots, driving keys in said slots, a carrier within the shaft for supporting said keys, means for enclosing the slotted portion of said shaft and means for closing the ends thereof to form an oil bath adjacent to said keys.

3. A Cardan shaft comprising a universal joint, two concentric tubes connected together and to one element of said joint, said tubes being spaced apart for part of their length, a third tube having one part inserted in the space between said concentric tubes, the overlapping parts of the three tubes having a plurality of corresponding longitudinal slots, driving keys in said slots and means for supporting said keys adapted to permit of relative sliding movement between said keys and the tubes within said slots, substantially as and for the purpose hereinbefore set forth.

4. A Cardan shaft comprising a universal joint, two telescopic portions of tubular shaft having a plurality of corresponding longitudinal slots therein, driving keys within said slots, said keys being shorter than said slots for the purpose of sliding therein, clamping discs within the shaft for supporting said keys and a bolt securing said clamping discs and keys together, substantially as and for the purpose hereinbefore set forth.

In testimony whereof I have signed my name to this specification.

FRANCIS ALBERT GARRETT.